Patented Feb. 6, 1940

2,189,530

UNITED STATES PATENT OFFICE 2,189,530

FINISHING COMPOSITION

Thomas McCreery, Philadelphia, Pa., assignor to E. I. du Pont de Nemours & Company, Wilmington, Del., a corporation of Delaware No Drawing. Application November 27, 1936,
Serial No. 112,990

8 Claims. (Cl. 134—15)

This invention relates to finishes for rigid surfaces and more particularly to finishes which are highly resistant to marring of the surface by abrasive action.

Metal storage cabinets, lockers, filing cabinets and other office equipment, lunch boxes, radiator covers, toys and similar sheet metal articles are usually finished with compositions comprised of treated oils, gums or resins and pigments as coloring matter. After the enamel has been applied, the articles are baked at a temperature varying between 180–350° F. to harden the finish. These protective and decorative finishes are usually easily marred by scratching or even slight abrasion.

This invention has therefore as the principal object the provision of compositions which produce a mar resistant finishes. A further object is a method for preparing such compositions. A still further object is the provision of metal articles finished with such compositions. Other objects will appear as the description of the invention proceeds.

These and other objects are accomplished in the present invention by the incorporation into the coating composition of a wax in the form of a colloidal suspension prepared in the specific manner as hereinafter described.

I am aware that it has been proposed to incorporate waxes for various purposes in coating compositions such as paints, varnishes, cellulose derivative compositions, rubber compositions, synthetic resin compositions, etc. Among such purposes are to improve water resistance, moisture impermeability and to impart polishing properties. According to the prior art practices, the wax or waxes are introduced into the composition by means of a solution in a suitable solvent which may be a hydrocarbon or an ester or in a molten condition, the composition usually being thoroughly stirred in order to obtain a homogeneous mixture. Even when such compositions are prepared under carefully controlled conditions, they are not uniformly stable with respect to the wax remaining in solution. On storage, the wax or a portion of it separates from the composition and cannot be readily redispersed therein. I have found further that the introduction of a wax into compositions according to such present practice procedures does not impart any satisfactory mar resistant properties to films deposited from the compositions. Also, the wax has a tendency to migrate to the surface of the film deposited therefrom and produce a surface having a greasy feel. Often there is produced a whiteness on the surface which is particularly objectionable on colored films, commonly known as frost or bloom. Even though this frost or bloom is removed by wiping, it has a tendency to recur thus imparting an unsightly appearance to the surface.

One embodiment of my invention involves the introduction into coating compositions of a wax which has previously been dispersed in colloidal form in a suitably bodied oil to which may be added for certain purposes gums which are commonly used in making varnishes such as ester gum, Pontianak, kauri, Congo, dammar, etc., if desired. As an illustration of this form of the invention, the following example is given.

EXAMPLE A

To prepare the wax dispersion, 62.0 parts by weight of carnauba wax and 555.0 parts of a heat bodied linseed oil are heated with stirring to approximately 600° F. The mass is maintained at this temperature for approximately 10 minutes. It is then allowed to cool to 150° F. or slightly lower, although not appreciably lower than 140° F. and 223 parts of mineral spirits having a boiling range of 150–215° C. added with vigorous stirring. A milky liquid results which is a colloidal dispersion of the wax in the bodied oil and the mineral thinner. The wax content of the dispersion based on the total finished composition is approximately 7.5%, there being a slight loss of the mineral spirits.

A wax content of the dispersion ranging up to approximately 10% has been found to be the most practical for the best working conditions. Higher percentages of wax are found difficult to work since the compositions approach the plastic state. The lower limit is of course governed only by practical limitations, it being preferred to have as high a percentage of wax in the dispersion as possible without introducing complications of mixing. About 2.00% is the lowest practical percentage.

For use in certain compositions particularly those known as low bake short oil compositions, the above described dispersion contains somewhat too much oil. For such low bake compositions and also for general use a modified colloidal dispersion may be used. Such a dispersion is prepared by heating with stirring to 600° F. the following ingredients, the parts being by weight:

EXAMPLE B

Rosin ester gum _____ 101.6
Carnauba wax _____ 48.4
Bodied oil _____ 211.0

The mass is held at the temperature of 600° F. for approximately 15 minutes and then allowed to cool to approximately 150° F. after which 382.0 parts of mineral spirits are added with vigorous agitation. The finished dispersion contains approximately 6.7% wax based on the total composition. The wax content of the dispersion may conveniently vary as noted above.

The bodied oil used in preparing the wax dispersion is made by heating linseed oil or a similar drying or semi-drying oil at approximately 580° F. for such a time as is necessary to produce the proper body or viscosity in the oil, which is usually for approximately one hour. During the heating a stream of air is slowly bubbled through the heated oil.

To obtain the wax in a properly colloidally dispersed form so that it will remain in the proper condition when incorporated in the finishing composition, the wax and bodied oil must be heated to approximately 600° F. and no thinner added until the mixture has been cooled below the melting point of the wax.

In producing coating compositions possessing mar resistant properties the wax dispersions are added to the compositions together with the remaining ingredients used in their preparation. As representative examples of such compositions, the following are given by way of illustration but it is understood not by limitation thereto. The parts in the compositions are by weight.

EXAMPLE I

| | |
|---|---|
| Dark chrome green pigment dispersion | 90.4 |
| Chrome yellow pigment dispersion | 104.3 |
| Light chrome green pigment dispersion | 151.2 |
| Carnauba wax dispersion | 110.0 |
| 50 gal. China-wood oil-linseed oil mixing varnish | 278.1 |
| Fossil gum solution | 71.2 |
| Gum solution* | 50.4 |
| Manganese drier solution (containing 2½% metallic manganese) | 20.8 |
| Mineral spirits | 22.1 |

*This gum solution is prepared by dissolving East India gum in an equal weight of commercial xylol or similar solvents.

The pigment dispersions are the respective pigments ground in a 45 gallon China-wood-linseed oil mixing varnish, the percentage of pigment in the dark chrome green dispersion being 47, in the chrome yellow 58, and in the light chrome green 63. The mixing varnish pigment dispersions and gum solutions are prepared according to the procedures well known in the art.

The enamel is preferably applied to the article to be coated by dipping but may be applied by other means. The coating dries completely in ½ hour at 275° F. The drying or baking time and temperatures may be varied by changes in the amount of mixing varnish and drier used and such changes are well within the scope of the invention.

EXAMPLE II

*Olive green spray enamel*

| | |
|---|---|
| Carbon black pigment dispersion | 222.0 |
| Ferrite yellow pigment dispersion | 188.0 |
| Lithopone pigment dispersion | 209.0 |
| Light chrome green pigment dispersion | 55.0 |
| Carnauba wax dispersion | 126.0 |
| 25 gallon China-wood oil mixing oil varnish | 114.0 |
| Fossil gum solution | 41.0 |
| Manganese drier solution (containing 2½% metallic manganese) | 29.0 |
| Mineral spirits | 2.0 |

The pigment dispersions are prepared as described under Example I the carbon black dispersion containing 32% pigment, the ferrite yellow 52.5% pigment, the lithopone 67.3% and the light chrome green 63% pigment. The other ingredients are as those previously described. To prepare the finished composition the various ingredients are mixed in any suitable manner. The enamel dries on being baked at 225° F. for 1 hour. These drying conditions may be varied as noted under Example I.

EXAMPLE III

*Red enamel*

| | |
|---|---|
| Chrome orange pigment dispersion | 24.2 |
| Red Lake pigment dispersion | 357.0 |
| Toluidine red pigment dispersion | 69.0 |
| Lithopone pigment dispersion | 70.5 |
| Carnauba wax dispersion containing rosin ester gum | 210.0 |
| Ester gum solution | 49.8 |
| Lead naphthenate drier solution (containing 16% metallic lead) | 24.9 |

The pigment dispersions are prepared as previously described and contain for the chrome orange 69% pigment, for the Red Lake 70% pigment, for the toluidine red 24% pigment and for the lithopone 67.3% pigment. The various ingredients are mixed to prepare the finished enamel as in the previous examples. The quantity of lead drier may be varied to suit other conditions of time and temperature of baking or drying. The enamel may be applied to the article to be coated by dipping, spraying or brushing and dries satisfactorily by baking at 200° F. for two hours.

In the coating compositions prepared according to the present invention, the wax is present in a highly colloidal condition and remains in this condition indefinitely so that its value persists in products which may be stored for relatively long periods of time. Under such conditions of storage the coating compositions may be subjected to elevated temperatures and also to reduced temperatures such as freezing or below and no separation of the wax from the coating composition takes place. Where the wax is introduced by means of a solution or in a molten condition and held in solution, separation from the main body of the coating composition would take place.

The amount of wax based on the total composition in the above examples is approximately .84% for the green dipping enamel, .95% for the olive green enamel and 1.82% for the red enamel. A range of from .1 to 2.5% wax on the total composition has been found to yield the most satisfactory result, a quantity less than 0.1% being insufficient to impart mar-resistant properties to the finish and quantities greater than 2.5% being unnecessary. The preferred specific amount to use in a particular composition will depend largely on the use of the composition and may be readily determined by experiment.

While the examples given are pigmented the colloidally dispersed wax may be used with equal success in oleoresinous vehicles without pigment as for example in clear finishes.

Other waxes than carnauba wax, having a relatively high melting point may be used although the use of carnauba wax is preferred.

The colloidal wax dispersion is used to best advantage in compositions which are to be baked since it is to such finishes that the maximum mar resistance is imparted by the wax. However, the colloidal wax dispersion may be used in air drying products to which it will impart to the finish or coating produced such desirable properties as washability, moisture resistance, resistance to grease and oil, etc.

As examples of compositions in which the colloidal wax dispersion may be used are furniture varnishes, flat varnishes, tin decorative varnishes and enamels, overprint varnishes, washable wall finishes, finishes for waterproofing new brick work, etc. Many other uses will be readily apparent.

As many apparently widely different embodiments of this invention may be made without departing from the spirit or scope thereof, it is understood that I do not limit myself to the specific embodiments thereof except as defined in the appended claims.

I claim:

1. Process which comprises heating linseed oil at a temperature of about 580° F. for about one hour, adding carnauba wax thereto with stirring, allowing the mass to cool to about 150° F., adding a solvent for the said wax, said wax being present in the composition in amount less than 10%.

2. In the process of preparing a wax coating composition in which the wax is colloidally dispersed in a bodied oil, the improvement which comprises heating a heat bodied fatty oil having drying properties and a wax to a temperature of about 600° F. and mixing until the wax is uniformly dispersed in the oil, cooling the mass to a temperature below about 150° F. and thereafter thinning the mass with a hydrocarbon thinner.

3. The process of preparing mar-resistant coating compositions in which a wax is colloidally dispersed in a heat bodied oil having drying properties, which comprises heating a heat bodied vegetable oil having drying properties to about 600° F., adding thereto a wax having a high melting point, maintaining the temperature for about ten minutes, allowing the mass to cool to a temperature below the melting point of the wax, and thereafter adding a thinner.

4. Process of claim 3 in which the product obtained is incorporated in a vehicle containing a gum.

5. Process of claim 3 in which the wax is carnauba wax.

6. Process of preparing a finishing composition which comprises dispersing approximately 62 parts of carnauba wax in 555 parts of a heat-bodied linseed oil with stirring at approximately 600° F., allowing the mass to cool to about 150° F., and adding thereto about 223 parts of mineral spirits having a boiling range between 150 and 215° C.

7. Process of claim 6 which comprises incorporating the resulting product in a vehicle containing pigment, drying oil varnish, and a gum.

8. Process of claim 3 in which the product obtained is added to an oil varnish containing a pigment.

THOMAS McCREERY.